United States Patent
Ambrose et al.

(10) Patent No.: US 6,635,724 B2
(45) Date of Patent: Oct. 21, 2003

(54) MODIFIED AMINOPLAST CROSSLINKERS AND POWDER COATING COMPOSITIONS CONTAINING SUCH CROSSLINKERS

(75) Inventors: Ronald R. Ambrose, Pittsburgh, PA (US); Anthony M. Chasser, Allison Park, PA (US); Shengkui Hu, Baden, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 2 days.

(21) Appl. No.: 09/918,788

(22) Filed: Jul. 31, 2001

(65) Prior Publication Data

US 2003/0033961 A1 Feb. 20, 2003

(51) Int. Cl.[7] .............................................. C08G 12/40
(52) U.S. Cl. .................. 525/509; 525/443; 525/159; 525/162; 525/406; 525/456; 525/510; 528/249; 528/254; 528/258; 528/261
(58) Field of Search ................................. 525/443, 509; 528/254, 258, 249, 261

(56) References Cited

U.S. PATENT DOCUMENTS

| 3,759,854 | A | | 9/1973 | Chang et al. ................. 260/21 |
|---|---|---|---|---|
| 3,904,623 | A | * | 9/1975 | Shay ........................... 544/196 |
| 3,980,732 | A | | 9/1976 | Isaksen et al. ............... 260/850 |
| 4,185,045 | A | | 1/1980 | Yoshihara et al. ........... 525/181 |
| 4,230,829 | A | | 10/1980 | Yoshihara et al. ........... 525/162 |
| 5,302,462 | A | | 4/1994 | Shah et al. .................. 428/482 |
| 6,316,109 | B1 | * | 11/2001 | Ambrose .................. 428/423.1 |

* cited by examiner

Primary Examiner—Patricia A. Short
(74) Attorney, Agent, or Firm—Diane R. Meyers

(57) ABSTRACT

A crosslinking agent is provided which is an ungelled reaction product of (a) an aminoplast resin and (b) a compound having active hydrogen groups reactive with the aminoplast resin (a) such that the crosslinking agent is essentially free of functional groups reactive with aminoplast resin and has a glass transition temperature of at least 10° C. Also provided is a method for preparing the crosslinking agent. Further provided is a curable powder coating composition including (A) a polymer having a glass transition temperature of at least 30° C. containing reactive functional groups and (B) the previously described crosslinking agent. Additionally provided is a multilayer composite coating composition including a base coat deposited from a film-forming composition and a top coat over the base coat deposited from the previously described powder coating composition. Coated substrates are also provided.

44 Claims, No Drawings

MODIFIED AMINOPLAST CROSSLINKERS AND POWDER COATING COMPOSITIONS CONTAINING SUCH CROSSLINKERS

CROSS-REFERENCE TO RELATED APPLICATIONS

Reference is made to related U.S. patent application Ser. Nos. 09/918,848, pending 09/918,983, pending 09/919,092, pending 09/919,094, pending and 09/919,299, pending filed concurrently herewith.

FIELD OF THE INVENTION

The present invention relates to crosslinking agents based on modified aminoplast resins and to powder coating compositions containing these crosslinking agents.

BACKGROUND OF THE INVENTION

In recent years, powder coatings have become increasingly popular because these coatings are inherently low in volatile organic content ("VOC"), which significantly reduces emissions of volatile organic compounds into the atmosphere during application and curing processes.

Hydroxyl, carboxyl, carbamate, and/or epoxy functional resins, such as acrylic and polyester resins having relatively high glass transition temperatures ("Tg"), are commonly used as main film-forming polymers for these coatings. The relatively high Tg of such polymers provides powder coatings having good storage stability. However when exposed to the extreme temperatures which can be encountered in many geographic areas during shipping and/or storage, even better powder coating stability is desired. By "storage stability" is meant the ability of the individual powder particles which comprise the powder coating to resist the tendency to adhere to one another, thereby causing "clumping" or "fusing" of the powder coating composition upon storage prior to application. Powder coating compositions having very poor storage stability can be difficult, if not impossible, to apply.

Aminoplast resins are well known in the art as low cost crosslinking agents for hydroxyl, carboxyl, and/or carbamate functional polymers in conventional liquid coating compositions. Common aminoplast resins are based on condensation products of formaldehyde with an amino- or amido-group carrying substance. Examples of these aminoplast resins include the methylol and alkoxymethyl derivatives of ureas, melamines, and benzoguanamines which are most commonly used in liquid coating compositions. Such aminoplast resins can provide enhanced coating properties such as exterior durability, chemical resistance, and mar resistance.

Attempts to produce powder coating compositions based on conventional aminoplast resins which exhibit these desirable properties heretofore have been unsatisfactory because these materials typically are in liquid form and, as such, can cause poor powder stability.

The methoxylated aldehyde condensates of glycoluril, which are solid products, are the aminoplast resins most commonly employed as crosslinking agents in powder coating compositions. Although solid in form, these materials nonetheless can depress the Tg of the powder coating composition significantly, even when combined with high Tg film-forming polymers such as the acrylic polymers described above. Such a depression in Tg also can result in poor powder stability.

Moreover, the use of conventional aminoplast resins in powder coating compositions can result in the phenomenon commonly referred to as "gassing". Gassing can occur as a result of vaporization of the alcohol generated in the thermally induced aminoplast crosslinking reaction. The alcohol vapor is driven off through the coating film upon heating and, as the viscosity of the coating increases during the curing process, "pinholes" or "craters" are formed as the gas escapes through coating surface.

U.S. Pat. No. 3,759,854 discloses heat-fusible powder coating compositions prepared by pre-reacting a thermosetting polyester resin and a suitable crosslinking resin such as a condensation product of an aldehyde with melamine, urea or benzoguanamine. The reaction product typically is prepared from 1 to 50 weight percent of the amine-aldehyde material and the reaction is carried to an extent such that the resulting powder has a softening point of at least 65° C.

U.S. Pat. No. 5,302,462 discloses a process for preparing a partially cured, but non-gelled, powder coating composition. The powder coating composition is prepared by reacting a less than stoichiometric amount of methoxymethyl aminotriazine with a substantially linear, hydroxyl-terminated polyester. The ratio of polyester to triazine ranges from 97:3 to 70:30 by weight. Methanol is stripped from the reaction mixture under reduced pressure. The powder coating composition provides a cured film free of surface defects caused by outgassing of methanol which volatilizes during the curing process. U.S. Pat. No. 3,980,732 claims a process for preparing a curable powder resin composition having a sintering temperature above 40° C. The method comprises condensing a methylolamino compound with an aliphatic alcohol and an aliphatic diamide to produce an aminoplast condensate with a Tg ranging from −10° C. to 100° C. and blending the aminoplast condensate with an acrylic or polyester resin having a glass transition temperature ranging from 60° C. to 100° C. The methylolamino compound is selected from methylolureas and methylolaminotriazines and contains no more than one unmethylolated NH bond per molecule. At least half of the methylol groups of the methylolamino compound have been condensed with the aliphatic alcohol or the aliphatic diamide. The molar ratio of the aliphatic alcohol to the methylolamino compound is at least 2; and the molar ratio of the methylolamino compound to the aliphatic diamide ranges from 1:0.5 to 1:1.5.

U.S. Pat. No. 4,185,045 discloses a powder coating composition comprising a solid crosslinking agent having a softening point ranging from 50° C. to 120° C. and prepared by heating 40 to 75% by weight of an acrylic polyol and 60 to 25% by weight of an alkoxyaminotriazine at 50° to 120°, and a base resin having a softening point ranging from 60° C. to 130° C. The alkoxyaminotriazine has less than 1 non-methylolated NH bond per triazine ring and at least 80% of the methylol groups have been etherified with an aliphatic or alicyclic alcohol or ethylene glycol monoalkyl ether.

U.S. Pat. No. 4,230,829 discloses a solid crosslinking agent having a softening point of 50° C. to 120° C. and prepared by heating 40 to 70% by weight of a polyester polyol and 60 to 30% by weight of an alkoxyaminotriazine. The alkoxyaminotriazine has one or less non-methylolated NH bond per triazine ring and at least 80% of the methylol groups have been alkoxylated with an alcohol. Powder coating compositions are prepared from a mixture of the crosslinking agent and a base resin having a softening point of 60° C. to 130° C.

While the above-described prior art aminoplast-based crosslinkers for powder coating compositions provide some improvement in "gassing" and powder stability over their liquid aminoplast counterparts, the powder coating compositions containing these crosslinkers can, nonetheless, exhibit some of the aforementioned deficiencies. In addition, many of the crosslinkers disclosed in the prior art can be high molecular weight, high viscosity, partially cured, and, thereby, unstable mixtures. Thus, there remains a need for an aminoplast crosslinking agent suitable for use in powder coating compositions which provides a storage stable powder composition having the desirable coating properties usually associated with aminoplast-based liquid coatings without causing coating surface defects due to "gassing".

SUMMARY OF THE INVENTION

In accordance with the present invention, provided is a crosslinking agent comprising the ungelled reaction product of (a) at least one aminoplast resin; and (b) at least one compound having active hydrogen groups reactive with aminoplast resin (a). The compound (b) is selected from at least one of (i) compounds having the following structure (I):

wherein X is aromatic; $R^1$, $R^2$, and $R^3$ can be the same or different and each independently represents H, (cyclo) alkyl having from 1 to 12 carbon atoms, aryl, alkaryl, aralkyl, or an active hydrogen-containing group, provided that at least one of $R^1$, $R^2$, and $R^3$ represents an active hydrogen-containing group which is reactive with the aminoplast resin (a); (ii) compounds having the following structure (II or III):

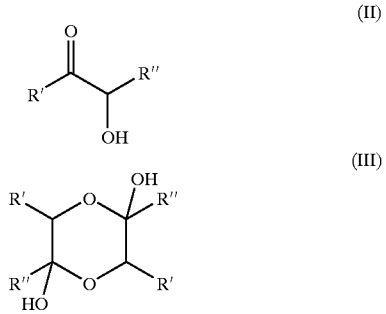

where R' and R" are the same or different and each independently represents an aromatic group or an alkyl group having 1 to 12 carbon atoms; and (iii) compounds different from both (i) and (ii) and having a melting point of at least 80° C. The crosslinking agent has a glass transition temperature of at least 10° C. and is essentially free of functional groups which are reactive with aminoplast resin.

Also provided is a method for preparing the aforementioned crosslinking agent. The method comprises the steps of (I) combining (a) at least one aminoplast resin and (b) at least one compound having active hydrogen groups reactive with aminoplast resin (a). The compound (b) is selected from (i) compounds having the previously described structure (I) where X, $R^1$, $R^2$, and $R^3$ are as described above for that structure, and (ii) compounds having the structures (II) and (III) as described above; and (iii) compounds different from (i) and (ii), and having a melting point of at least 80° C., to form a reaction admixture; (II) heating the reaction admixture to a temperature ranging from 90° C. to 135° C.; and (III) maintaining the temperature achieved in (II) for a time sufficient to obtain an ungelled reaction product having a glass transition temperature of at least 10° C. which is essentially free of active hydrogen-containing groups as determined by infrared spectroscopy.

Further provided is a curable powder coating composition comprising a solid particulate film-forming mixture of (A) a polymer containing reactive functional groups and having a Tg of at least 30° C. and (B) the crosslinking agent described above.

Also provided is a multi-layer composite coating composition comprising a base coat deposited from a film forming composition and a top coat over at least a portion of the base coat. The top coat is deposited from the aforedescribed curable powder coating composition. Coated substrates are also provided.

DETAILED DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

As aforementioned, the crosslinking agent of the present invention comprises the ungelled reaction product of (a) at least one aminoplast resin and (b) at least one compound having active hydrogen groups reactive with aminoplast resin (a). The compound (b) is selected from at least one of (i) compounds having the previously described structure (I) where X, $R^1$, $R^2$, and $R^3$ are as described above for that structure, and (ii) compounds having the structure (II) or (III) where R' and R" are the same or different and each independently represents an aromatic group or an alkyl group having 1 to 12 carbon atoms; and (iii) compounds different from (i) and (ii) and having a melting point of at least 80° C. The crosslinking agent is essentially free of functional groups which are reactive with aminoplast resin and has a Tg of at least 10° C.

By "ungelled" is meant that the reaction product has an intrinsic viscosity when dissolved in a suitable solvent. The intrinsic viscosity of the reaction product is an indication of its molecular weight. A gelled reaction product, on the other hand, since it is of essentially infinitely high molecular weight, will have an intrinsic viscosity too high to measure. Moreover, the reaction product can be melted, solidified, and remelted.

The aminoplast resins suitable for use in the preparation of the crosslinking agent of the present invention include those which are or are derived from at least one of glycoluril, aminotriazine, and benzoguanamine. Such compounds include, for example, alkoxyalkyl derivatives of melamine, glycoluril, benzoguanamine, acetoguanamine, formoguanamine, spiroguanamine, and the like.

In one embodiment of the present invention, the aminoplast resin (a) comprises a compound derived from glycoluril, such as alkoxylated aldehyde condensates of glycoluril. The alkoxylated aldehyde condensates of glycoluril suitable for use as the aminoplast resin (a) can be prepared by reacting glycoluril, or acetylene diurea, with an aldehyde, typically formaldehyde, to form tetra-alkylol glycoluril. In this embodiment, the alkylol groups usually are etherified with a mono-alcohol, such as a $C_1$ to $C_6$ mono-alcohol, to form tetra-alkoxy alkyl glycoluril. A suitable, nonlimiting example of such a tetra-alkoxyalkyl glycoluril is tetra-methoxy methyl glycoluril which is commercially available under the tradename POWDERLINK® 1174 from Cytec Industries, Inc.

Aminoplast resins are based on the condensation products of formaldehyde, with an amino- or amido-group carrying substance. Condensation products obtained from the reaction of alcohols and formaldehyde with melamine, urea or benzoguanamine are most common and preferred herein. However, condensation products of other amines and amides can also be employed, for example, aldehyde condensates of triazines, diazines, triazoles, guanadines, guanamines, and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandiamide, formaguanamine, acetoguanamine, glycoluril, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, and 3,4,6-tris(ethylamino)-1,3,5 triazine.

While the aldehyde employed is most often formaldehyde, other similar condensation products can be made from other aldehydes, such as acetaldehyde, crotonaldehyde, acrolein, benzaldehyde, furfural, and glyoxal.

The aminoplast resins typically contain methylol or other alkylol groups and, in most instances, at least a portion of these alkylol groups are etherified by a reaction with an alcohol. Any monohydric alcohol can be employed for this purpose, including such alcohols as methanol, ethanol, propanol, butanol, pentanol, hexanol, cyclohexanol, heptanol, and others, as well as benzyl alcohol, other aromatic alcohols, cyclic alcohols such as cyclohexanol, monoethers of glycols, and halogen-substituted or other substituted alcohols, such as 3-chloropropanol and butoxyethanol. Commonly employed aminoplast resins are substantially alkylated with methanol or butanol.

In one embodiment of the present invention, the aminoplast resins comprise highly alkylated, low imino aminoplast resins which have a degree of polymerization ("DP") of less than 2.0, often less than 1.8, and typically less than 1.5. Generally, the number average degree of polymerization is defined as the average number of structural units per polymer chain (see George Odian, *Principles of Polymerization*, John Wiley & Sons (1991)). For purposes of the present invention, a DP of 1.0 would indicate a completely monomeric triazine structure, while a DP of 2.0 indicates two triazine rings joined by a methylene or methylene-oxy bridge. It should be understood that the DP values reported herein and in the claims represent average DP values as determined by gel permeation chromatography data.

Non-limiting examples of suitable aminotriazine compounds include alkoxyalkyl aminotriazines, such as (methoxymethyl)melamine-formaldehyde resin, for example CYMEL® 300; ethylated-methylated benzoguanamine-formaldehyde resin, for example CYMEL® 1123; and methylated-butylated melamine-formaldehyde resin, for example CYMEL® 1135, all of which are commercially available from Cytec Industries, Inc.

As aforementioned, in addition to the aminoplast resin (a), the reactants used to form the crosslinking agent of the present invention further comprise (b) at least one compound having active hydrogen groups reactive with aminoplast resin (a). As previously discussed, the compound (b) is selected from at least one of (i) compounds having the following structure (I):

wherein X is aromatic; $R^1$, $R^2$, and $R^3$ can be the same or different and each independently represents H, (cyclo)alkyl having from 1 to 12 carbon atoms, aryl, alkaryl, aralkyl, or an active hydrogen-containing group which is reactive with the aminoplast resin (a), provided that at least one of $R^1$, $R^2$, and $R^3$ represents an active hydrogen-containing group which is reactive with the aminoplast resin (a); (ii) compounds having the following structure (II or III):

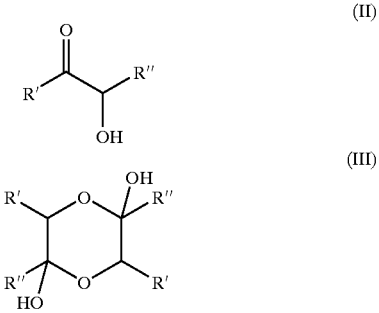

where R' and R" are the same or different and each independently represents an aromatic group or an alkyl group having 1 to 12 carbon atoms; and (iii) compounds different from both (i) and (ii) and having a melting point of at least 80° C. Mixtures of compounds (i), (ii), and (iii) can be used. As used herein, by "(cyclo)alkyl" is meant both alkyl and cycloalkyl groups.

In one embodiment of the present invention, compound (b) comprises at least one of compound (i) having the previously described structure (I). As aforementioned, the substitutent group X represents an aromatic, for example, phenyl, and substituted phenyl groups, or a cycloaliphatic group, for example, cyclohexyl. These groups can be any fused or bridged ring structures such as naphthyl, anthracyl, and benzofuranyl. Also, the aromatic groups can be unsubstituted or substituted with heteroatoms, for example O, N, and S. Non-limiting examples of aromatic groups suitable as the substituent include phenyl, naphthyl, anthracyl, pyrene, benzofuranyl, and the like.

As previously mentioned, at least one of $R^1$, $R^2$, and $R^3$ represents a group comprising an active hydrogen-containing group reactive with the aminoplast resin (a) such as a group selected from hydroxyl, amide, amine, carboxylic acid, carbamate, urea, thiol, and combinations thereof. In one embodiment of the present invention, compound (b) comprises at least one compound having the structure (I) above wherein at least one of $R^1$, $R^2$, and $R^3$ represents a group comprising at least one hydroxyl group. Nonlimiting examples of active hydrogen-containing compounds suitable for use as the reactant (b)(i) include benzyl alcohol and substituted benzyl alcohols such as 3-phenoxybenzyl alcohol and 4-methoxybenzyl alcohol, phenethyl alcohol, benzopinacol, N-benzylformamide, benzyl lactate, benzyl mandelate, benzyl mercaptan, N-benzylmethamine, 3-furanmethanol, furfuryl alcohol, pyridylcarbinols, for example, 2-pyridylcarbinol, and 3-pyridylcarbinol, 1-pyrenemethanol, 9-anthrancenemethanol, 9-fluorenemethanol, 9-hydroxyfluorene, 9-hydroxyxanthene, 9-phenylxanthen-9-ol, 4-stilbenemethanol and triphenylmethanol.

In another embodiment of the present invention, the active hydrogen containing compound (b) (ii) comprises compounds having the following structure (II):

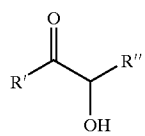

(II)

or dimer derivatives thereof as discussed below, where R' and R" are the same or different and each independently represents an aromatic group or an alkyl group having 1 to 12 carbon atoms. In one embodiment of the present invention, one or both of the substituent groups R' and R" are aromatic groups, for example phenyl, naphthyl, methoxy phenyl, and dimethylaminophenyl groups.

Also, suitable aromatic groups can contain one or more heteroatoms, such as O, N, and S, either internal or external to the aromatic ring. The heteroatoms external to the ring may be attached directly to the ring or indirectly through one or more carbon atoms. One or more heteroatoms may be present in each such substituent and one or more substituents may be attached to the aromatic ring. The heteroatom containing substituent group(s) may be attached to the aromatic ring in any position or combination of positions on the ring. Suitable heteroatomic substituent groups include but are not limited to amines, ethers, esters, ketones, amides, halides, sulfonamides, nitro and carboxylic acid groups. Heteroatoms internal to the aromatic ring may be present in any position or combination of positions. For example, such heteroaromatic groups can include but are not limited to furans, pyridines, thiophenes, triazines, imidazoles, oxazoles, thiazoles, pyrazoles and triazoles. Non-limiting examples of such compounds include anisoin, pyridoin, furoin, bufyroin.

In one particular embodiment of the present invention, the active hydrogen-containing compound (b)(ii) comprises an active hydrogen-containing compound selected from benzoin, hydroxycyclohexyl phenylketone, and mixtures thereof.

Compounds having the general structure (II) above are known to form dimeric derivatives, particularly when R' and R" are alkyl (Merck Index, 11ed, p 10, 55).

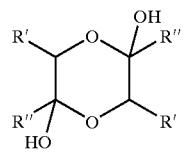

(III)

Such dimer derivatives can have the structure (III) above where R' and R" are as described above for the structure (II).

In yet another embodiment of the present invention, the active hydrogen-containing compound (b) comprises at least one of compound (iii), which is different from both (i) and (ii) and has a melting point of at least 80° C. The melting point of a compound can be determined by using a standard capillary melting point apparatus or by thermal analysis (ASTM E974-95).

Generally, the melting point of the active hydrogen-containing compound (b)(iii) is less than 250° C., usually less than 220° C., and typically less than 200° C. Also, the melting point of the active hydrogen containing compound (b)(iii) generally is at least 80° C., usually at least 90° C., and typically at least 100° C. The melting point of the active hydrogen-containing compound (b)(iii) can range between any combination of these values inclusive of the recited values. Nonlimiting examples of compounds suitable for use as reactant (b)(iii) include mono-alcohols such as borneol, norborneol, isoborneol, 1-adamantanemethanol, 1-adamantanol, 2-methyl-2-adamantanol and 5-norbornen-2-ol; secondary amides, such as alphatic cyclic amides such as 1-methylhydantoin, 2,4-thiazolidinedione, 2-azacyclotridecanone, 3,4,5,6,7,8-hexahydro-2(1H)-quinoline, 4-azatricyclo(4.3.1.1(3,8))undecan-5-one and 4-methoxy-3-pyrrolin-2-one; aliphatic open chain amides, such as N-(1-adamantyl)acetamide) and N-tert-butylacrylamide; aromatic (poly)cyclic amides, including lactams, such as 1-acetamidopyrene, 2-acetamide-3-nitro-9-fluorenone, 2-acetoamide-7-fluorfluorene, 2-acetamidofluorene, 4-acetamido-9-fluorenone, naphthol AS acetate, 1-phenyl-3-pyrazolidinone, 2,3-dimethyl-1-(4-methylphenyl)-3-pyrazolin-5-one, 3,4-dimethyl-1-phenyl-3-pyrazolin-5-one, 3-(4-ethoxyphenyl)-1-(2-nitrophenyl)-hydantoin, 4-acetamidoantipyrine, and 4-acetamidobenzaldehyde; aromatic open chain amides, such as 3-acetamidocoumarin and p-acetophenetidide; and mono-urethanes such as those obtained by reacting high melting point mono-alcohols (such as those described immediately above) with suitable mono-isocyanates.

The active hydrogen-containing compound (b) can comprise one or more of compounds, (b)(i), (b)(ii), and (b)(iii). Inclusion of the active hydrogen-containing compound (b) as a reactant in the preparation of the crosslinking agent of the present invention can provide several advantages. First, reaction of the active hydrogen-containing compound (b) with the aminoplast resin (a) can generally increase the Tg of the resultant crosslinker as compared to an analogous crosslinking agent having no such modification. Also, compounds such as compounds (b)(i), (b)(ii) and (b)(iii) described above can allow for the reaction of more alkoxy groups of the aminoplast resin (a) without resulting in a gelled reaction product. Such a crosslinking agent when incorporated into curable powder coating compositions can effect less gassing upon curing. Furthermore, when crosslinking agents of the present invention are used in curable powder coating compositions, the degassing agent may be released in situ. This can reduce adverse effects, for example, yellowing of the film, which can be caused by the presence of the degassing agent during curing processes. The present invention is also directed to a method for preparing the above-described crosslinking agent. The aminoplast resin (a) and the active hydrogen-group containing compound (b) are combined in a suitably equipped reaction vessel, typically with a suitable solvent and an appropriate strong acid as catalyst. Any suitable solvent can be used, with aromatic solvents being most often employed. Non-limiting examples of suitable aromatic solvents include xylene, toluene, and mixtures of these solvents. Non-limiting examples of strong acids suitable for use as a catalyst include, but are not limited to, para-toluene sulfonic acid, dodecyl benzene sulfonic acid, and dodecyl benzene disulfonic acid. Normal condensation techniques as are well-known in the art can be used. The reaction admixture is heated to a temperature ranging from 90° C. to 135° C., usually from 100° C. to 130° C., and held at that temperature for a period sufficient to obtain an ungelled product having a Tg of at least 10° C. The reaction is terminated when the reaction end point (e.g., the disappearance of the OH signal) is detected by infrared spectroscopy or other appropriate analytical method.

In the preparation of the crosslinking agent of the present invention, the aminoplast resin (a) and the active hydrogen-group containing compound (b) are combined in a ratio such that the resulting reaction product is essentially free of functionality reactive with aminoplast resin. The reaction is monitored for the disappearance of such functionality relative to an internal standard (i.e., the signal of a constant structure which will remain unchanged during the reaction, for example, the carbonyl signal) via infrared spectroscopy or other appropriate analytical method.

The aminoplast resin (a) generally constitutes 90 weight percent or less, often 85 weight percent or less, and typically 80 weight percent or less of the reaction mixture, based on the total combined weight of reactants (a) and (b). Also, the aminoplast resin (a) generally constitutes at least 55 weight percent, often at least 60 weight percent, and typically at least 65 weight percent of the reaction mixture, based on the total combined weight reactants (a) and (b). The percent by weight of the aminoplast resin (a) present in the reaction mixture can range between any combination of these values inclusive of the recited values.

The active hydrogen-containing compound (b) generally constitutes 45 weight percent or less, often 40 weight percent or less, and typically 35 weight percent or less of the reaction mixture, based on the total combined weight of reactants (a) and (b). Also, the active hydrogen group-containing compound (b) generally constitutes at least 10 weight percent, often at least 15 weight percent, and typically at least 20 weight percent of the reaction mixture, based on the total combined weight of reactants (a) and (b). The percent by weight of the active hydrogen-containing compound (b) present in the reaction mixture can range between any combination of these values inclusive of the recited values.

The crosslinking agent of the present invention generally has a glass transition temperature of at least 10° C., often at least 15° C., usually at least 20° C., and typically at least 25° C. Also, the crosslinking agent generally has a glass transition temperature less than 85° C., often less than 80° C., usually less than 75° C., and typically less than 70° C. The glass transition temperature of the crosslinking agent can range between any combination of these values, inclusive of the recited values.

The Tg can be calculated or measured experimentally using differential scanning calorimetry (rate of heating 10° C. per minute, Tg taken at the first inflection point). Unless otherwise indicated, the stated Tg as used herein refers to the measured Tg.

As mentioned above, the present invention also relates to a curable powder coating composition comprising a solid particulate, film-forming mixture of (1) a polymer containing reactive functional groups, and (2) the crosslinking agent described in detail above.

Curable powder coatings are particulate compositions that are solid and free flowing at ambient room temperature. As mentioned above, the curable powder coating compositions of the present invention comprise, as a first component (1), at least one reactive functional group-containing polymer having a glass transition temperature of at least 30° C., e.g., a hydroxyl and/or an epoxide functional acrylic polymer, and as a second component (2), the crosslinking agent described above. The components (1) and (2) of the curable powder coating composition may each independently comprise one or more functional species, and are each present in amounts sufficient to provide cured coatings having a desirable combination of physical properties, e.g., smoothness, optical clarity, scratch resistance, solvent resistance and hardness.

As used herein, the term "reactive" refers to a functional group that forms a covalent bond with another functional group under suitable reaction conditions.

As used herein, the term "cure" as used in connection with a composition, e.g., "a curable composition," shall mean that any crosslinkable components of the composition are at least partially crosslinked. In certain embodiments of the present invention, the crosslink density of the crosslinkable components, i.e., the degree of crosslinking, ranges from 5% to 100% of complete crosslinking. In other embodiments, the crosslink density ranges from 35% to 85% of full crosslinking. In other embodiments, the crosslink density ranges from 50% to 85% of full crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen. This method determines the glass transition temperature and crosslink density of free films of coatings or polymers. These physical properties of a cured material are related to the structure of the crosslinked network.

According to this method, the length, width, and thickness of a sample to be analyzed are first measured, the sample is tightly mounted to the Polymer Laboratories MK III apparatus, and the dimensional measurements are entered into the apparatus. A thermal scan is run at a heating rate of 3° C./min, a frequency of 1 Hz, a strain of 120%, and a static force of 0.01N, and sample measurements occur every two seconds. The mode of deformation, glass transition temperature, and crosslink density of the sample can be determined according to this method. Higher crosslink density values indicate a higher degree of crosslinking in the coating.

The polymer (1) can be selected from a variety of polymers having aminoplast-reactive functional groups as are well known in the art, so long as the Tg of the polymer is sufficiently high to permit the formation of a stable, solid particulate composition. The Tg of the polymer (1) generally is at least 30° C., often at least 40° C., and typically at least 50° C. The Tg of the polymer (1) also generally is less than 130° C., often less than 100° C., and typically less than 80° C. The Tg of the functional group-containing polymer (1) can range between any combination of these values inclusive of the recited values.

Also, as used herein, the term "polymer" is meant to refer to oligomers and both homopolymers and copolymers. Unless stated otherwise, as used in the specification and the claims, molecular weights are number average molecular weights for polymeric materials indicated as "Mn" and obtained by gel permeation chromatography using a polystyrene standard in an art-recognized manner.

Non-limiting examples of polymers having reactive functional groups useful in the curable powder coating compositions of the invention as the polymer (1) include those selected from acrylic, polyester, polyurethane, polyepoxide, and polyether polymers. The polymer (1) typically comprises reactive functional groups selected from hydroxyl, epoxy, carboxyl and/or carbamate functional groups, or a combination thereof. In one embodiment of the present invention, the polymer (1) comprises hydroxyl and/or carbamate functional groups. In another embodiment of the invention, the polymer (1) comprises epoxy and/or hydroxyl functional groups.

The functional group-containing polymer (1) generally is present in the curable powder coating compositions of the present invention in an amount ranging from at least 5 percent by weight, often at least 20 percent by weight, typically at least 30 percent by weight, and usually at least 40 percent by weight based on the total weight of the powder coating composition. The functional group-containing polymer (1) also generally is present in the powder coating compositions of the present invention in an amount less than 95 percent by weight, often less than 90 percent by weight, typically less than 85 percent by weight, and usually less than 80 percent by weight based on the total weight of the powder coating composition. The amount of the functional group-containing polymer (1) present in the powder coating compositions of the present invention can range between any combination of these values inclusive of the recited values.

As mentioned above, the powder coating compositions of the present invention further comprise, as component (2), the crosslinking agent described above. The crosslinking agent (2) generally is present in the powder coating compositions of the present invention in an amount ranging from at least 5 percent by weight, often at least 10 percent by weight, typically at least 15 percent by weight, and usually at least 20 percent by weight based on the total weight of the powder coating composition. The crosslinking agent (2) also generally is present in the powder coating compositions of the present invention in an amount less than 95 percent by weight, often less than 80 percent by weight, typically less than 70 percent by weight, and usually less than 60 percent by weight based on the total weight of the powder coating composition. The amount of the crosslinking agent (2) present in the powder coating compositions of the present invention can range between any combination of these values inclusive of the recited values.

If desired, the powder coating compositions of the present invention also can include an adjuvant curing agent different from the crosslinking agent (2). The adjuvant curing agent can be any compound having functional groups reactive with the functional groups of the polymer (1) or the crosslinking agent (2) described above. Non-limiting examples of suitable adjuvant curing agents include blocked isocyanates, triazine compounds, glycoluril resins, and mixtures thereof.

The blocked isocyanates suitable for use as the adjuvant curing agent in the powder coating compositions of the invention are known compounds and can be obtained from commercial sources or may be prepared according to published procedures. Upon being heated to cure the powder coating compositions, the isocyanates are unblocked and the isocyanate groups become available to react with the functional groups of the polymer (1).

Any suitable aliphatic, cycloaliphatic or aromatic alkyl monoalcohol known to those skilled in the art can be used as a blocking agent for the isocyanate. Other suitable blocking agents include oximes, lactams, triazoles, DIPA, DMP, and malonates. Non-limiting examples of suitable blocked isocyanate curing agents include those based on isophorone diisocyanate blocked with epsilon-caprolactam; toluene 2,4-toluene diisocyanate blocked with epsilon-caprolactam; or phenol-blocked hexamethylene diisocyanate. The blocked isocyanates mentioned immediately above are described in detail in U.S. Pat. No. 4,988,793 at column 3, lines 1 to 36. Preferred blocked isocyanate curing agents include BF-1530, which is the reaction product of epsilon-caprolactam blocked T1890, a trimerized isophorone diisocyanate ("IPDI") with an isocyanate equivalent weight of 280, and BF-1540, a uretidione of IPDI with an isocyanate equivalent weight of 280, all of which are available from Creanova of Somerset, N.J.

Conventional aminoplast crosslinkers can be used as the adjuvant curing agent provided that the Tg of the coating is not lowered to an undesirable extent. A particularly preferred class of aminoplast resins include aldehyde condensates of glycoluril, such as those described above. Glycoluril resins suitable for use as the adjuvant curing agent in the powder coating compositions of the invention include POWDER-LINK® 1174 commercially available from Cytec Industries, Inc. of Stamford, Conn.

When employed, the adjuvant curing agent generally is present in the powder coating compositions of the present invention in an amount ranging from 5 to 10 percent by weight, often from 5 to 20 percent by weight, typically from 5 to 30 percent by weight, and usually from 5 to 50 percent by weight based on the total weight of the powder coating composition.

Also suitable for use as an adjuvant curing agent in the powder coating compositions of the present invention are triazine compounds, such as the tricarbamoyl triazine compounds described in detail in U.S. Pat. No. 5,084,541. When used, the triazine curing agent is typically present in the powder coating composition of the present invention in an amount ranging up to about 20 percent by weight, and usually from about 1 to 20 percent by weight, percent by weight based on the total weight of the powder coating composition. Mixtures of the above-described curing agents also can be used advantageously.

Also, it should be understood that for purposes of the present invention, the curable powder coating compositions which contain epoxy group-containing polymers typically also include an epoxide-reactive curing (i.e., crosslinking) agent, usually an acid functional curing agent, in addition to the aminoplast-based crosslinking agent (2). A secondary hydroxyl group can be generated upon reaction of each epoxy functional group with a functional group of the epoxide-reactive curing agent. These secondary hydroxyl groups are then available for further reaction with the aminoplast-based crosslinking agent (2).

Epoxide-reactive curing agents which can be used in curable powder coating compositions comprising an epoxide functional polymer may have functional groups selected from the group consisting of hydroxyl, thiol, primary amines, secondary amines, acid (e.g. carboxylic acid), and mixtures thereof. Useful epoxide reactive curing agents having amine functionality include, for example, dicyandiamide and substituted dicyandiamides. Preferably, the epoxide reactive curing agent has carboxylic acid groups.

In one embodiment of the present invention, the epoxide reactive crosslinking agent has carboxylic acid functionality and is substantially crystalline. By "crystalline" is meant that the co-reactant contains at least some crystalline domains, and correspondingly may contain some amorphous domains. While not necessary, it is preferred that the epoxide reactive crosslinking agent have a melt viscosity less than that of the epoxy functional polymer (at the same temperature). As used herein and in the claims, by "epoxide reactive crosslinking agent" is meant that the epoxide reactive crosslinking agent has at least two functional groups that are reactive with epoxide functionality.

Typically, the epoxide reactive crosslinking agent is a carboxylic acid functional curing agent, which contains from 4 to 20 carbon atoms. Examples of carboxylic acid functional crosslinking agents useful in the present invention include, but are not limited to, dodecanedioic acid, azelaic acid, adipic acid, 1,6-hexanedioic acid, succinic acid, pimelic acid, sebasic acid, maleic acid, citric acid, itaconic acid, aconitic acid, and mixtures thereof.

Other suitable carboxylic acid functional curing agents include those represented by the following general formula IV,

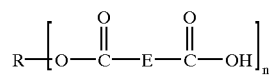

(IV)

In general formula IV, R is the residue of a polyol, E is a divalent group having from 1 to 10 carbon atoms, and n is an integer of from 2 to 10. Examples of polyols from which R of general formula IV may be derived include, but are not limited to, ethylene glycol, di(ethylene glycol), trimethylolethane, trimethylolpropane, pentaerythritol, di-trimethylolpropane, di-pentaerythritol, and mixtures thereof. Divalent linking groups from which E may be selected include, but are not limited to, methylene, ethylene, propylene, isopropylene, butylene, pentylene, hexylene, heptylene, octylene, nonylene, decylene, cyclohexylene, e.g., 1,2-cyclohexylene, substituted cyclohexylene, e.g., 4-methyl-1,2-cyclohexylene, phenylene, e.g., 1,2-phenylene, and substituted phenylene, e.g., 4-methyl-1,2-phenylene and 4-carboxylic acid-1,2-phenylene. The divalent linking group E is preferably aliphatic.

The curing agent represented by general formula IV is typically prepared from a polyol and a dibasic acid or cyclic anhydride. For example, trimethylol propane and hexahydro-4-methylphthalic anhydride are reacted together in a molar ratio of 1:3 respectively, to form a carboxylic acid functional curing agent. This particular curing agent can be described with reference to general formula IV as follows, R is the residue of trimethylol propane, E is the divalent linking group 4-methyl-1,2-cyclohexylene, and n is 3. Carboxylic acid functional curing agents described herein with reference to general formula IV are meant to include also any unreacted starting materials and/or co-products, e.g., oligomeric species, resulting from their preparation and contained therein.

Curable powder coating compositions comprising an epoxide functional polymer and an epoxide-reactive curing agent can also include one or more cure catalysts for catalyzing the reaction between the reactive functional groups of the crosslinking agent and the epoxide groups of the polymer. Examples of cure catalysts for use with acid functional crosslinking agents include tertiary amines, e.g., methyl dicocoamine, and tin compounds, e.g., triphenyl tin hydroxide. When employed, the curing catalyst is typically present in the curable powder coating composition in an amount of less than 5 percent by weight, e.g., from 0.25 percent by weight to 2.0 percent by weight, based on total weight of the composition.

Curable powder coating compositions comprising epoxide functional polymers and epoxide-reactive curing agents typically contain both in a total amount ranging from 50 percent to 99 percent by weight, based on total weight of the composition, e.g., from 70 percent to 85 percent by weight, based on total weight of the composition. The epoxide reactive curing agent is typically present in the curable powder coating composition in an amount corresponding to a portion of these recited ranges, i.e., 5 to 40, particularly 15 to 30, percent by weight based on the total weight of the composition. The equivalent ratio of epoxide equivalents in the epoxide functional polymer to the equivalents of reactive functional groups in the curing agent is typically from 0.5:1 to 2:1, e.g., from 0.8:1 to 1.5:1.

Curable powder coating compositions of the present invention comprising an epoxide functional polymer as component (1) typically contain an epoxide reactive curing agent in addition to the crosslinking agent (2) in an amount ranging from 1 to 50 weight percent, usually from 2 to 40 weight percent and more typically from 15 to 30 weight percent based on total weight of the powder coating composition.

The powder coating compositions of the present invention can further include additives as are commonly known in the art. Typical additives include benzoin, used to reduce entrapped air or volatiles; flow aids or flow control agents which aid in the formation of a smooth and/or glossy surface, for example, MODAFLOW® available from Monsanto Chemical Co., waxes such as MICROWAX® C available from Hoechst, fillers such as calcium carbonate, barium sulfate and the like; pigments and dyes as colorants; UV light stabilizers such as TINUVIN® 123 or TINUVIN® 900 available from CIBA Specialty Chemicals and catalysts to promote the various crosslinking reactions.

Such additives are typically present in the powder coating compositions of the present invention in an amount ranging from 1 to 20 weight percent based on total weight of the powder coating composition.

The powder coating compositions of the invention are typically prepared by blending the functional group-containing polymer (1) and the crosslinking agent (2) for approximately 1 minute in a Henschel blade blender. The mixture is then usually catalyzed and extruded through a Baker-Perkins twin screw extruder at a temperature ranging from 158° F. to 266° F. (70° C. to 130° C.). The resultant chip is usually ground and classified to an appropriate particle size, typically between 20 and 200 microns, in a cyclone grinder/sifter.

The powder coating compositions of the invention can be applied to a variety of substrates including metallic substrates, for example, aluminum and steel substrates, and non-metallic substrates, for example, thermoplastic or thermoset composite substrates. The powder coating compositions are typically applied by spraying, and in the case of a metal substrate, by electrostatic spraying which is preferred, or by the use of a fluidized bed. The powder coating can be applied in a single sweep or in several passes to provide a film having a thickness after cure of from about 1 to 10 mils (25 to 250 micrometers), usually about 2 to 4 mils (50 to 100 micrometers).

Generally, after application of the powder coating composition, the powder coated substrate is heated to a temperature sufficient to cure the coating, typically to a temperature ranging from 250° F. to 500° F. (121.1° C. to 260.0° C.) for 1 to 60 minutes, and preferably from 300° F. to 400° F. (148.9° C. to 204.4° C.) for 15 to 30 minutes.

The curable powder coating composition can be applied as a primer or primer surfacer, or as a top coat, for example, a "monocoat". In one embodiment, the present invention is directed to a curable powder coating composition which is advantageously employed as a top coat in a multi-layer composite coating composition. Such a multi-layer composite coating composition generally comprises a film-forming base coat which typically is deposited from a film-forming base coating (typically pigmented) composition and a top coat applied over the base coat, the top coat being deposited from the curable powder coating composition of the present invention as described above. In a particular embodiment, the multi-component composite coating composition is a color-plus-clear system where the top coat is deposited from a powder coating composition which is substantially pigment-free, i.e., a clear coat.

The film-forming composition from which the base coat is deposited can be any of the compositions useful in coatings applications, for example, in automotive applications where color-plus-clear systems are most often used. A film-forming composition conventionally comprises a resinous binder and often a pigment to serve as a colorant. Particularly useful resinous binders include acrylic polymers, polyesters including alkyds, and polyurethanes.

The resinous binders for the base coat can be organic solvent-based materials, such as those described in U.S. Pat. No. 4,220,679. Water-based coating compositions, such as those described in U.S. Patent Nos. 4,403,003; 4,147,679; and 5,071,904, also can be used as the base coat composition.

As mentioned above, the base coat compositions also can contain pigments of various types as colorants. Suitable metallic pigments include aluminum flake, bronze flake, copper flake, and the like. Other examples of suitable pigments include mica, iron oxides, lead oxides, carbon black, titanium dioxide, talc, as well as a variety of color pigments.

Optional ingredients for the base coat film-forming compositions include those which are well known in the art of surface coatings and include surfactants, flow control agents, thixotropic agents, fillers, anti-gassing agents, organic co-solvents, catalysts, and other suitable adjuvants.

The base coat film-forming compositions can be applied to the substrate by any of the conventional coating techniques, such as brushing, spraying, dipping or flowing, but they are most often spray-applied. The usual spray techniques and equipment for air spraying, airless spraying and electrostatic spraying can be used.

The base coat film-forming compositions are typically applied to the substrate such that a cured base coat having a film thickness ranging from 0.5 to 4 mils (12.5 to 100 micrometers) is formed thereon.

After forming a film of the base coat on the substrate, the base coat can be cured or alternatively given a drying step in which solvent, i.e., organic solvent and/or water, is driven off by heating or an air drying step before application of the clear coat. Suitable drying conditions will depend on the particular base coat film-forming composition and on the ambient humidity with certain water-based compositions. In general, a drying time ranging from 1 to 15 minutes at a temperature of 75° F. to 200° F. (21° C. to 93° C.) is adequate.

The curable powder top coating composition can be applied over at least a portion of the base coat by any of the methods of application described above. As discussed above, the curable powder top coating composition can be applied to a cured or a dried base coat before the base coat has been cured. In the latter case, the top coat and the base coat are cured simultaneously.

Illustrating the invention are the following examples which are not to be considered as limiting the invention to their details. Unless otherwise indicated, all parts and percentages in the following examples, as well as throughout the specification, are by weight.

EXAMPLES

These examples describe the preparation of the crosslinking agents in accordance with the present invention. The crosslinking agents were prepared by modifying an appropriate melamine-based aminoplast resin.

Example A

Into a two-liter four-necked reaction kettle equipped with a thermometer, a mechanical stirrer, nitrogen inlet, and means for removing the by-product (methanol) were placed 640.0 parts of Cymel 300 (available from Cytec Industries, Inc.), 424.0 parts of benzoin, 366.0 parts of xylene, and 0.64 part of p-toluenesulfonic acid. The mixture was heated to 120° C. over 30 minutes and the temperature was maintained while the methanol by-product was removed from the system. The reaction was monitored by measuring the IR spectra of the mixture and was terminated when the end point was detected. Thereafter, the mixture was concentrated at a temperature of 100° C. to 130° C. in a vacuum of 3–50 mm Hg to remove the xylene solvent. The product thus obtained was a slightly yellow solid.

Example B

Into a two-liter four-necked reaction kettle equipped with a thermometer, a mechanical stirrer, nitrogen inlet, and means for removing the by-product (methanol) were placed 640.0 parts of Cymel 300, 308.0 parts of isoborneol, 84.8 parts of benzoin, 442.8 parts of xylene, and 0.64 part of p-toluenesulfonic acid. The mixture was heated to 120° C. over 30 minutes and the temperature was maintained while the methanol by-product was removed from the system. The reaction was monitored by measuring the IR spectra of the mixture and was terminated when the end point was detected. Thereafter, the mixture was concentrated at a temperature of 100° C. to 130° C. in a vacuum of 3–50 mm Hg to remove the xylene solvent. The product thus obtained was a slightly yellow solid.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore we claim:

1. A crosslinking agent comprising an ungelled reaction product of the following reactants:
(a) at least one aminoplast resin; and
(b) a compound selected from at least one of:
(i) compounds having the following structure (I):

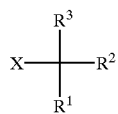

(I)

wherein X is aromatic and is selected from the group consisting of substituted phenyl groups, unsubstituted or substituted naphthyl, unsubstituted or substituted anthracyl, unsubstituted or substituted pyrene, and unsubstituted or substituted benzofuranyl; $R^1$, $R^2$, and $R^3$ can be the same or different and each independently represents H, (cyclo)alkyl having from 1 to 12 carbon atoms, aryl, alkaryl, aralkyl, or an active hydrogen-containing group,
provided that at least one of $R^1$, $R^2$, and $R^3$ represents an active hydrogen-containing group which is reactive with the aminoplast resin (A)
(ii) compounds having the following structure (II) or (III):

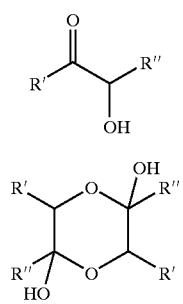

where R' and R" are the same or different and each independently represents an aromatic group or an alkyl group having 1 to 12 carbon atoms; and
(iii) compounds different from (i) and (ii) and having a melting point of at least 80° C. selected from borneol, norborneol, isoborneol, 5-norbornen-2-ol, 1-adamantanemethanol, 1-adamatanol and 2-methyl-2-adamantanol, wherein the crosslinking agent has a glass transition temperature of at least 10° C. and is essentially free of functional groups which are reactive with the aminoplast resin.

2. The crosslinking agent of claim 1, wherein the aminoplast resin (a) is or is derived from at least one crosslinking agent selected from glycoluril, aminotriazine, and beazoguanamine.

3. The crosslinking agent of claim 2, wherein the aminoplast resin comprises an aminotriazine compound.

4. The crosslinking agent of claim 3, wherein the aminotriazine compound comprises an (alkoxyalkyl) aminotriazine having one or less non-alkylated NH bond per triazine ring.

5. The crosslinking agent of claim 4, wherein the (alkoxyalkyl) aminotriazine compound comprises an (methoxymethyl) aminotriazine compound.

6. The crosslinking agent of claim 4, wherein the (alkoxyalkyl) aminotriazine compound has a degree of polymerization of 3.0 or less.

7. The crosslinking agent of claim 2, wherein the aminoplast resin (a) comprises an alkoxylated aldehyde condensate of glycoluril.

8. The crosslinking agent of claim 7, wherein the alkoxylated aldehyde condensate of glycoluril comprises tetramethoxy methylglycoluril.

9. The crosslinking agent of claim 1, wherein the compound (b) comprises at least one compound having the structure (I).

10. The crosslinking agent of claim 9, wherein at least one of $R^1$, $R^2$, and $R^3$ represents an active hydrogen-containing group selected from hydroxyl, amino, amido, thiol, carboxyl, carbamate, urea, and mixtures thereof.

11. The crosslinking agent of claim 9, wherein at least one of $R^1$, $R^2$, and $R^3$ represents a group comprising at least one hydroxyl group.

12. The crosslinking agent of claim 1, wherein the compound (b) comprises at least one of compound b (ii).

13. The crosslinking agent of claim 12, wherein the compound (b) comprises a hydroxyl functional group-containing compound having the following structure (II):

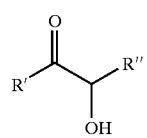

or dimer derivatives thereof wherein R' and R" are the same or different and each independently represents a (cyclo)alkyl group having 1 to 12 carbon atoms or an aromatic group.

14. The crosslinking agent of claim 13, wherein one or both of R' and R" represent aromatic groups.

15. The crosslinking agent of claim 14, wherein the compound (b) comprises a compound selected from benzoin, hydroxycyclohexyl phenyl ketone, and mixtures thereof.

16. The crosslinking agent of claim 15, wherein the compound (b) comprises benzoin.

17. The crosslinking agent of claim 15, wherein the compound (b) comprises hydroxycyclohexyl phenyl ketone.

18. The crosslinking agent of claim 1, wherein compound (b) comprises at least one of compound (b) (iii).

19. The crosslinking agent of claim 18, wherein the compound (b) comprises at least one compound selected from borneol, norborneol, and isoborneol.

20. The crosslinking agent of claim 19, wherein the compound (b) comprises isoborneol.

21. The crosslinking agent of claim 1, wherein compound (b) comprises at least one compound selected from benzoin, isoborneol, and mixtures thereof.

22. The crosslinking agent of claim 1 comprising the ungelled reaction product of the following:
(a) at least one aminoplast resin comprising (alkoxyalkyl) aminotriazine having one or less non-alkylated NH bond per triazine ring; and
(b) at least one compound selected from benzoin, isoborneol, and mixtures thereof,
wherein said crosslinking agent has a glass transition temperature of at least 10° C. and is essentially free of hydroxyl groups.

23. A method for preparing a crosslinking agent, the method comprising the following steps:
(I) combining the following reactants:
(a) at least one aminoplast resin;
(b) at least one compound having active hydrogen groups reactive with aminoplast resin (a), said compound selected from at least one of:

(i) compounds having the following structure (I):

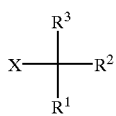

(I)

wherein X is aromatic and is selected from the group consisting of substituted phenyl groups, unsubstituted or substituted naphthyl, unsubstituted or substituted anthracyl, unsubstituted or substituted pyrene, and unsubstituted or substituted benzofuranyl; $R^1$, $R^2$, and $R^3$ can be the same or diffaent and each independently represents H, (cyclo)alkyl having from 1 to 12 carbon atoms, aryl, alkaryl, aralkyl, or an active hydrogen-containing group, provided that at least one of $R^1$, $R^2$, and $R^3$ represents an active hydrogen-containing group which is reactive with the aminoplast resin (A)

(ii) compounds having the following structure (II) or (III):

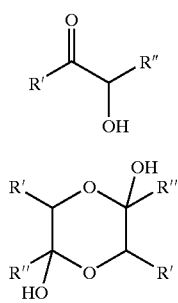

where R' and R" are the same or different and each independently represents an aromatic group or an alkyl group having 1 to 12 carbon atoms; and (iii) compounds different from (i) and (ii) and having a melting point of at least 80° C. selected from borneol, norborneol, isoborneol, 5-norbornen-2-ol, 1-adamantanemethanol, 1-adamatanol and 2-methyl-2-adamantanol to form a reaction admixture;

(II) heating the reaction admixture to a temperature ranging from 90° C. to 135° C.; and (III) maintaining the temperature achieved in (II) for a time sufficient to obtain an ungelled reaction product having a glass transition temperature of at least 10° C. which is essentially free of active hydrogen-containing groups as detennined by infrared spectroscopy.

24. The method of claim 23, wherein the aminoplast resin (a) is or is derived from at least one crosslinking agent selected from glycoluril, aminotriazine, and benzoguanamine.

25. The method of claim 24, wherein the aminoplast resin comprises an aminotriazine compound.

26. The method of claim 25, wherein the amimotriazine compound comprises an (alkoxyalkyl) aminotriazine having one or less non-alkylated NH bond per triazine ring.

27. The method of claim 26, wherein the aminotriazine compound comprises an (methoxymethyl) aminotriazine compound.

28. The method of claim 26, wherein the (alkoxyalkyl) aminotriazine compound has a degree of polymerization of 3.0 or less.

29. The method of claim 24, wherein the aminoplast resin (a) comprises an alkoxylated aldehyde condensate of glycoluril.

30. The crosslinking agent of claim 29, wherein the alkoxylated aldehyde condensate of glycoluril comprises tetramethoxy methylglycoluril.

31. The method of claim 23, wherein the compound (b) comprises at least one compound having the structure (I).

32. The method of claim 31, wherein at least one of $R^1$, $R^2$, and $R^3$ represents an active hydrogen-containing group selected from hydroxyl, amino, amido, thiol, carboxyl, carbamate, urea, and mixtures thereof.

33. The method of claim 31, wherein at least one of $R^1$, $R^2$, and $R^3$ represents a group comprising at least one hydroxyl group.

34. The method of claim 23, wherein the compound (b) comprises at least one of compound (b) (ii).

35. The method of claim 34, wherein the compound (b) comprises a hydroxyl functional group-containing compound having the following structure (II):

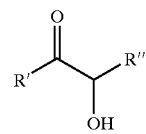

(II)

or dimer derivatives thereof, wherein R' and R" are the same or different and each independently represents an (cyclo) alkyl group having 1 to 12 carbon atoms or an aromatic group.

36. The method of claim 35, wherein one or both of the R' and R" represent aromatic groups.

37. The method of claim 36, wherein the compound (b) comprises a compound selected from benzoin, hydroxycyclohexyl phenyl ketone, and mixtures thereof.

38. The method of claim 37, wherein the compound (b) comprises benzoin.

39. The method of claim 37, wherein the compound (b) comprises hydroxycyclohexyl phenyl ketone.

40. The method of claim 23, wherein the compound (b) comprises at least one of compound (b) (iii).

41. The method of claim 40, wherein the compound (b) comprises at least one compound selected from borneol, norborneol and isoborneol.

42. The method of claim 41, wherein the compound (b) comprises isoborneol.

43. The method of claim 23, wherein compound (b) comprises at least compound selected from benzoin, isoborneol, and mixtures thereof.

44. A method for preparing a crosslinking agent, the method comprising the following steps:

(I) combining the following reactants:
(a) at least one aminoplast resin comprising (alkoxyalkyl) aminotriazine having one or less non-alkylated NH bond per triazine ring; and
(b) at least one compound selected from benzoin, isoborneol, and mixtures thereof, (II) heating the reaction admixture to a temperature ranging from 90° C. to 135° C.; and (III) maintaining the temperature achieved in (II) for a time sufficient to obtain an ungelled reaction product having a glass transition temperature of at least 10° C. which is essentially free of active hydrogen-containing groups as determined by infrared spectroscopy.

* * * * *